US011334536B2

(12) United States Patent
Studer et al.

(10) Patent No.: US 11,334,536 B2
(45) Date of Patent: *May 17, 2022

(54) SPECIFYING AND APPLYING RULES TO DATA

(71) Applicant: Ab Initio Technology LLC, Lexington, MA (US)

(72) Inventors: Scott Studer, Georgetown, MA (US); Amit Weisman, Bedford, MA (US); David Phillimore, Acton, MA (US)

(73) Assignee: Ab Initio Technology LLC, Lexington, MA (US)

( * ) Notice: Subject to any disclaimer, the term of this patent is extended or adjusted under 35 U.S.C. 154(b) by 259 days.

This patent is subject to a terminal disclaimer.

(21) Appl. No.: 16/258,776

(22) Filed: Jan. 28, 2019

(65) Prior Publication Data
US 2019/0391964 A1  Dec. 26, 2019

Related U.S. Application Data

(63) Continuation of application No. 14/886,472, filed on Oct. 19, 2015, now Pat. No. 10,191,923.
(Continued)

(51) Int. Cl.
*G06F 16/00* (2019.01)
*G06F 16/21* (2019.01)
(Continued)

(52) U.S. Cl.
CPC ........ *G06F 16/214* (2019.01); *G06F 16/2365* (2019.01); *G06F 16/2379* (2019.01); *G06Q 30/02* (2013.01)

(58) Field of Classification Search
CPC ............... G06F 16/214; G06F 16/2365; G06F 16/2379; G06F 16/24565; G06F 16/24564;
(Continued)

(56) References Cited

U.S. PATENT DOCUMENTS 6,075,880 A  6/2000  Kollhof et al.
6,904,412 B1  6/2005  Broadbent et al.
(Continued)

FOREIGN PATENT DOCUMENTS

CN  103942228  7/2014
CN  104850618  8/2015
(Continued)

OTHER PUBLICATIONS

James Taylor, Real-Time Responses with Big Data, 2014, 23 pages, 2014.

*Primary Examiner* — Noosha Arjomandi
(74) *Attorney, Agent, or Firm* — Occhiuti & Rohlicek LLP

(57) ABSTRACT

A method for applying a rule to data includes receiving data from a data source and processing a particular data unit of an ordered number of data units derived at least in part from the received data. The processing includes determining a set of data units including an ordered subset of data units from the ordered number of data units, each data unit of the ordered subset being related to the particular data unit and occurring before the particular data unit in the ordered number of data units. Prior to applying the rule the state variable is updated to a state that would result from iterating in order through the set of data units and, for each data unit of the ordered subset, applying the rule to the data unit. The rule is then applied to the particular data unit including reading the updated value of the state variable.

10 Claims, 9 Drawing Sheets

Related U.S. Application Data

(60) Provisional application No. 62/605,909, filed on Oct. 20, 2014.

(51) Int. Cl.
    *G06F 16/23*     (2019.01)
    *G06Q 30/02*     (2012.01)

(58) Field of Classification Search
     CPC ........... G06F 16/2246; G06F 16/24578; G06F 16/322; G06F 16/9027; G06Q 30/02
     See application file for complete search history.

(56) References Cited

U.S. PATENT DOCUMENTS

| | | | |
|---|---|---|---|
| 7,017,142 B1 | 3/2006 | Ehnebuske et al. | |
| 7,222,127 B1* | 5/2007 | Bem | G06F 16/3346 |
| 7,634,495 B2 | 12/2009 | Magarian et al. | |
| 7,865,344 B2 | 1/2011 | Wozniak | |
| 7,882,178 B2 | 2/2011 | Lingafelt et al. | |
| 7,930,293 B2 | 4/2011 | Fox et al. | |
| 8,032,573 B2 | 10/2011 | Richard | |
| 8,069,129 B2 | 11/2011 | Gould et al. | |
| 8,140,362 B2* | 3/2012 | Deshpande | G06Q 10/10 705/7.11 |
| 8,595,231 B2 | 11/2013 | Arends et al. | |
| 8,756,407 B2 | 6/2014 | Lim | |
| 8,949,166 B2 | 2/2015 | Nelke et al. | |
| 9,317,624 B2* | 4/2016 | Perkins | G06F 16/90 |
| 9,596,162 B1 | 3/2017 | Velusamy et al. | |
| 9,767,141 B2 | 9/2017 | Eker et al. | |
| 9,898,566 B2* | 2/2018 | Iskander | G06F 30/36 |
| 11,012,414 B2* | 5/2021 | Moore | H04L 61/1511 |
| 11,080,336 B2* | 8/2021 | Van Dusen | G06Q 50/01 |
| 2002/0107754 A1* | 8/2002 | Stone | H04M 15/73 705/34 |
| 2005/0216421 A1 | 9/2005 | Barry et al. | |
| 2006/0242084 A1 | 10/2006 | Moses | |
| 2008/0126931 A1 | 5/2008 | Kojima et al. | |
| 2008/0256014 A1* | 10/2008 | Gould | G06N 5/04 706/48 |
| 2009/0063639 A1 | 3/2009 | Lingafelt et al. | |
| 2011/0153667 A1 | 6/2011 | Parmenter et al. | |
| 2011/0307436 A1* | 12/2011 | Cai | G06F 16/322 706/48 |
| 2013/0166515 A1* | 6/2013 | Kung | G06Q 10/063 707/690 |
| 2014/0108357 A1 | 4/2014 | Procops et al. | |
| 2014/0222752 A1 | 8/2014 | Isman et al. | |
| 2014/0229456 A1* | 8/2014 | Hollifield | G06F 16/2365 707/697 |
| 2014/0273930 A1 | 9/2014 | Rossi | |
| 2015/0095752 A1 | 4/2015 | Studer et al. | |
| 2016/0092811 A1* | 3/2016 | Iyer | G06Q 10/0637 705/7.36 |
| 2016/0110351 A1 | 4/2016 | Studer et al. | |
| 2016/0110407 A1* | 4/2016 | Studer | G06F 16/2365 707/694 |
| 2016/0275130 A1 | 9/2016 | O'Reilly et al. | |
| 2017/0046530 A1 | 2/2017 | Raj | |
| 2017/0091201 A1 | 3/2017 | Chabot et al. | |
| 2017/0236060 A1 | 8/2017 | Ignatyev | |
| 2017/0293953 A1 | 10/2017 | Grass et al. | |
| 2019/0391964 A1* | 12/2019 | Studer | G06F 16/214 |

FOREIGN PATENT DOCUMENTS

| | | |
|---|---|---|
| JP | 2008-117093 | 5/2008 |
| JP | 2011527052 | 10/2011 |

\* cited by examiner

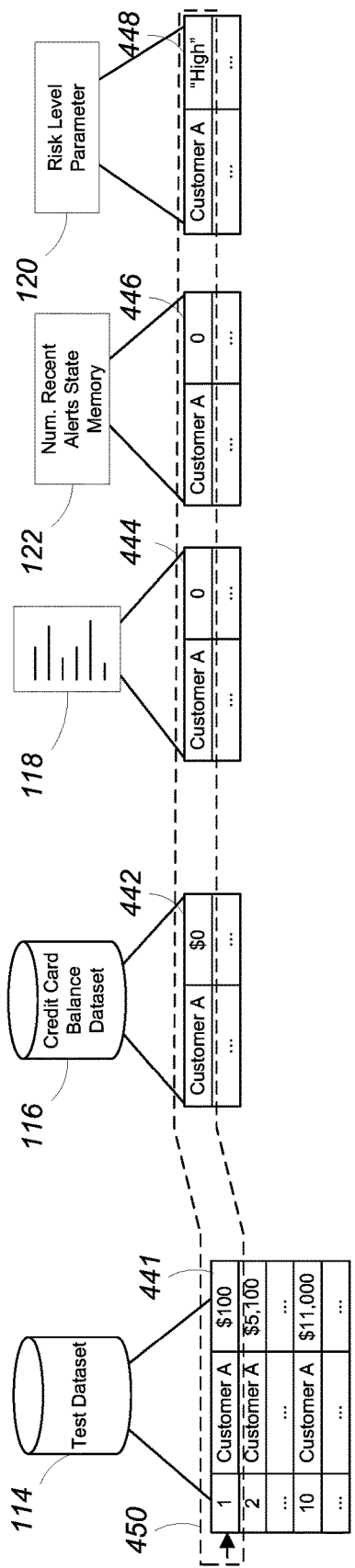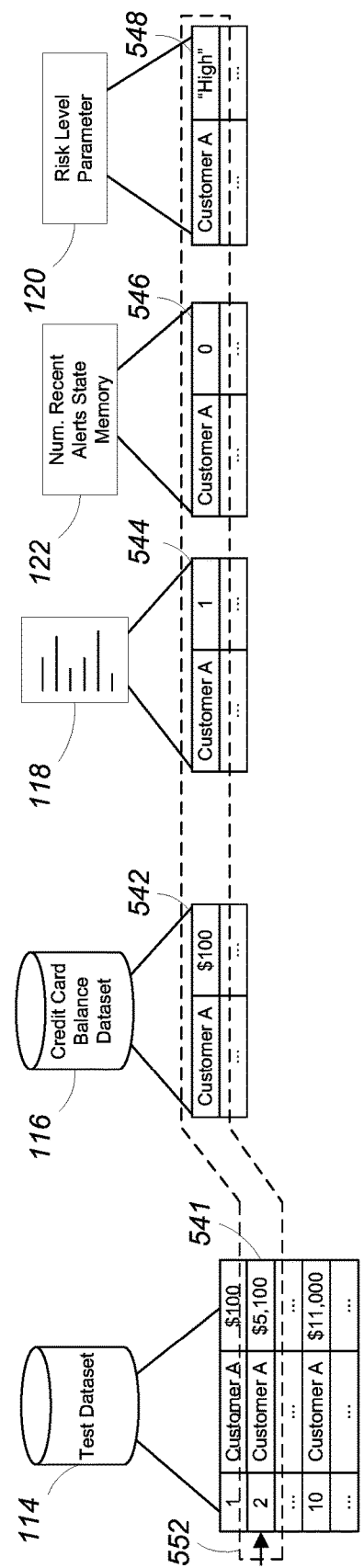

| Triggers | | | | Outputs | |
|---|---|---|---|---|---|
| Current State | Travel Related | Classification | | New State | Message |
| "Eligible" | any | any | | "Notified" | "Thanks for using ACME Card. This months cash back rewards categories are Travel and Food." |
| "Notified" | Is Travel Related | any | | "First Travel" | "You just received double cash back for your travel purchase. Did you know you get double cash back for food related purchases this month as well?" |
| "Notified" | | Food and Drug | | "First Food" | "You just received double cash back for your food purchase. Did you know that you get double cash back for Travel related purchases this month?" |
| "First Travel" | any | Food and Drug | | "Complete" | "You've received double cash back for your food and travel purchases. Stay tuned for next months categories!" |
| "First Food" | Is Travel Related | any | | "Complete" | "You've received double cash back for your food and travel purchases. Stay tuned for next months categories!" |
| any | any | any | | Default: Current State | Default: "" |

FIG. 11

_(1)_
SPECIFYING AND APPLYING RULES TO DATA

CROSS-REFERENCE TO RELATED APPLICATIONS

This application is a continuation of U.S. application Ser. No. 14/886,472, filed on Oct. 19, 2015, which claims priority to U.S. application Ser. No. 62/065,909, filed on Oct. 20, 2014, each of which is incorporated herein by reference.

BACKGROUND

This description relates to specifying and applying rules to data.

In some examples, one or more rules may be applied to records in a data processing system. For example, rules may be used to verify the quality of the records or to trigger events based on information included in the records. The rules may be specified by a developer using a user interface. In some examples, the results of applying rules may differ, depending on whether the rules were applied during a development phase or a production phase.

SUMMARY

In one aspect, in general, a method for applying a rule to data from one or more data sources includes receiving data from a first data source and processing a particular data unit of an ordered number of data units derived at least in part from the data received from the first data source. The processing includes determining a first set of data units that includes an ordered subset of data units from the ordered number of data units, each data unit included in the ordered subset being related to the particular data unit and occurring before the particular data unit in the ordered number of data units, prior to applying the rule to the particular data unit, updating at least one state variable to a state that would result from iterating in order through the first set of data units and, for each data unit of the ordered subset, applying the rule to the data unit, and applying the rule to the particular data unit including reading the updated value of the state variable.

Aspects may include one or more of the following features.

The processing may be associated with a first mode of applying the rule to data from one or more data sources in a testing environment in which the particular data unit is selected within a user interface for testing the rule. The first mode of applying the rule to data from one or more data sources in a testing environment may be configured to produce results, for each data unit of the ordered number of data units, consistent with results produced from a second mode of applying the rule to data from one or more data sources in a production environment. The first mode of applying the rule to data from one or more data sources in a testing environment may be configured to produce results, for each data unit of the ordered number of data units, consistent with results produced from a third mode of applying the rule to data from one or more data sources in the testing environment in which all of the ordered number of data units are tested in a batch.

The first set of data units may consist of the ordered subset of data units. Updating the state variable may include iterating in order through the first set of data units and, for each data unit of the ordered subset, applying the rule to the data unit and writing an updated value of the state variable based on a result of applying the rule to the data unit. The first set of data units may include data units not in the ordered subset of data units, and iterating in order through the first set of data units may include determining if a data unit is a member of the ordered subset of data units. The number of data units may include a related data unit that is a first occurrence of a data unit related to the particular data unit in the number of data units, and an initial data unit of the ordered subset of data units is a data unit other than the related data unit.

The method may include storing the updated values of the state variable for each application of the rule to data units of the ordered number of data units in a state variable cache. Applying the rule to the initial data unit of the ordered subset of data units may include reading an updated value of the state variable that was stored in response to application of the rule to a data unit occurring before the initial data unit in the number of data units from the state variable cache. The data unit occurring before the initial data unit in the number of data units may be the nearest data unit related to the initial data unit and occurring before the initial data unit in the number of data units. The rule may include a number of rule cases. A result of testing at least one rule case of the number of rule cases may depend on the value of the state variable.

Applying the rule to the particular data unit of the number of data units may include testing the at least one rule case of the number of rule cases against the updated value of the state variable. An initial data unit of the ordered subset of data units may be a first occurrence of a data unit related to the particular data unit in the ordered number of data units. At least one rule case of the number of rule cases may be based on a value derived from a second data source that is different from the first data source. The second data source may be dynamically accessed after beginning of the processing. Each data unit of the ordered number of data units may include one or more values from a record of the first data source, and at least one value from the second data source. The ordered number of data units may be ordered according to an order of a set of records of the first data source. Each data unit of the ordered subset of data units may be related to the other data units of the ordered subset of data units by a shared identifier. The shared identifier may include a key field value.

Processing the particular data unit may include determining whether one or more previously obtained values for the particular data unit exist in a data unit cache and are valid, and if the previously obtained values are determined to exist and to be valid, obtaining one or more values for the particular data unit from the data unit cache, otherwise obtaining one or more values for the particular data unit from one or more data sources including the first data source. Determining whether the previously obtained values for the particular data unit are valid may include comparing an elapsed time since the previously obtained values were obtained to a predetermined elapsed time threshold.

Obtaining one or more values for the particular data unit from the one or more data sources may include opening a connection to the first data source for receiving one or more values for the particular data unit and maintaining the connection in an open state for receiving one or more values for other data units of the ordered number of data units. Obtaining one or more values for the particular data unit from the one or more data sources may include receiving one or more values for the particular data unit from a previously opened connection to the first data source. The first data source may be a database. The first data source may be a data archive file.

The method may include, for at least at first data unit of the ordered subset, determining whether previously obtained values for the first data unit exist in a data unit cache and are valid, and if the previously obtained values are determined to exist and to be valid, obtaining one or more values for the first data unit from the data unit cache, otherwise obtaining one or more values for the first data unit from one or more data sources including the first data source. Determining whether the previously obtained values for the first data unit are valid may include comparing an elapsed time since the previously obtained values were obtained to a predetermined elapsed time threshold. Obtaining one or more values for the first data unit from the one or more data sources may include opening a connection to the first data source for receiving one or more values for the first data unit and maintaining the connection in an open state for receiving one or more values for other data units of the ordered number of data units. Obtaining one or more values for the first data unit from the one or more data sources may include receiving one or more values for the first data unit from a previously opened connection to the first data source.

In another aspect, in general, software stored in a non-transitory form on a computer-readable medium, for applying a rule to data from one or more data sources includes instructions for causing a computing system to receive data from a first data source and process a particular data unit of an ordered number of data units derived at least in part from the data received from the first data source. The processing includes determining a first set of data units that includes an ordered subset of data units from the ordered number of data units, each data unit included in the ordered subset being related to the particular data unit and occurring before the particular data unit in the ordered number of data units, prior to applying the rule to the particular data unit, updating at least one state variable to a state that would result from iterating in order through the first set of data units and, for each data unit of the ordered subset, applying the rule to the data unit, and applying the rule to the particular data unit including reading the updated value of the state variable.

In another aspect, in general, a computing system for applying a rule to data from one or more data sources includes an input device or port configured to receive data from a first data source and at least one processor configured to process a particular data unit of an ordered number of data units derived at least in part from the data received from the first data source. The processing includes determining a first set of data units that includes an ordered subset of data units from the ordered number of data units, each data unit included in the ordered subset being related to the particular data unit and occurring before the particular data unit in the ordered number of data units, prior to applying the rule to the particular data unit, updating at least one state variable to a state that would result from iterating in order through the first set of data units and, for each data unit of the ordered subset, applying the rule to the data unit, and applying the rule to the particular data unit including reading the updated value of the state variable.

In another general aspect, a computing system for applying a rule to data from one or more data sources includes means for receiving data from a first data source and means for processing a particular data unit of an ordered number of data units derived at least in part from the data received from the first data source. The processing includes determining a first set of data units that includes an ordered subset of data units from the ordered number of data units, each data unit included in the ordered subset being related to the particular data unit and occurring before the particular data unit in the ordered number of data units, prior to applying the rule to the particular data unit, updating at least one state variable to a state that would result from iterating in order through the first set of data units and, for each data unit of the ordered subset, applying the rule to the data unit, and applying the rule to the particular data unit including reading the updated value of the state variable.

In another aspect, in general, a computing system for applying a rule to data from one or more data sources, the computing system includes an input device or port configured to receive data from a first data source and at least one processor configured to process a number of data units derived at least in part from the data received from the first data source in a selected one of at least two different modes of applying the rule. The modes include a first mode in which the number of data units are received in a particular order, and processing the number of data units includes, for each of at least some of the number of data units, writing an updated value to at least one state variable based on a result of applying the rule to the data unit and a second mode in which a selection of particular data unit of the number of data units is received. Processing the particular data unit includes: (1) determining a first set of data units that includes an ordered subset of data units from the number of data units, each data unit included in the ordered subset occurring before the particular data unit in the number of data units, (2) prior to applying the rule to the particular data unit, updating at least one state variable to a state that would result from processing the first set of data units in the first mode, and (3) applying the rule to the particular data unit including reading the updated value of the state variable.

Aspects may include one or more of the following features.

The second mode may be a mode of applying the rule to data from one or more data sources in a testing environment in which the particular data unit is selected within a user interface for testing the rule. The first mode may be a mode of applying the rule to data from one or more data sources in a production environment. The first mode may be a mode of applying the rule to data from one or more data sources in the testing environment in which all of the number of data units are tested in a batch. The first set of data units may consist of the ordered subset of data units.

Updating the state variable may include iterating in order through the first set of data units and, for each data unit of the ordered subset, applying the rule to the data unit and writing an updated value of the state variable based on a result of applying the rule to the data unit. The first set of data units may include data units not in the ordered subset of data units, and iterating in order through the first set of data units may include determining if a data unit is a member of the ordered subset of data units. Each data unit included in the ordered subset may be related to the particular data unit, and the number of data units may include a related data unit that is a first occurrence of a data unit related to the particular data unit in the number of data units, and an initial data unit of the ordered subset of data units is a data unit other than the related data unit.

Processing the particular data unit in the second mode may include storing the updated values of the state variable for each application of the rule to data units of the number of data units in a state variable cache. Applying the rule to the initial data unit of the ordered subset of data units may include reading an updated value of the state variable that was stored in response to application of the rule to a data unit occurring before the initial data unit in the number of data units from the state variable cache. The data unit occurring before the initial data unit in the number of data units may be the nearest data unit related to the initial data unit and occurring before the initial data unit in the number of data units. The rule may include a number of rule cases.

A result of testing at least one rule case of the number of rule cases may depend on the value of the state variable. Applying the rule to the particular data unit of the number of data units may include testing the at least one rule case of the number of rule cases against the updated value of the state variable. Each data unit included in the ordered subset may be related to the particular data unit, and an initial data unit of the ordered subset of data units may be a first occurrence of a data unit related to the particular data unit in the number of data units. At least one rule case of the number of rule cases may be based on a value derived from a second data source that is different from the first data source. The second data source may be dynamically accessed after beginning of the processing.

Each data unit of the number of data units may include one or more values from a record of the first data source, and at least one value from the second data source. The number of data units may be ordered according to an order of a set of records of the first data source. Each data unit included in the ordered subset may be related to the particular data unit, and to the other data units of the ordered subset of data units, by a shared identifier. The shared identifier may include a key field value.

Processing the particular data unit may include determining whether one or more previously obtained values for the particular data unit exist in a data unit cache and are valid, and if the previously obtained values are determined to exist and to be valid, obtaining one or more values for the particular data unit from the data unit cache, otherwise obtaining one or more values for the particular data unit from one or more data sources including the first data source. Determining whether the previously obtained values for the particular data unit are valid may include comparing an elapsed time since the previously obtained values were obtained to a predetermined elapsed time threshold. Obtaining one or more values for the particular data unit from the one or more data sources may include opening a connection to the first data source for receiving one or more values for the particular data unit and maintaining the connection in an open state for receiving one or more values for other data units of the number of data units.

Obtaining one or more values for the particular data unit from the one or more data sources may include receiving one or more values for the particular data unit from a previously opened connection to the first data source. The first data source may be a database. The first data source may be a data archive file.

Processing the particular data unit in the second mode may include, for at least at first data unit of the ordered subset, determining whether previously obtained values for the first data unit exist in a data unit cache and are valid, and if the previously obtained values are determined to exist and to be valid, obtaining one or more values for the first data unit from the data unit cache, otherwise obtaining one or more values for the first data unit from one or more data sources including the first data source.

Determining whether the previously obtained values for the first data unit are valid may include comparing an elapsed time since the previously obtained values were obtained to a predetermined elapsed time threshold. Obtaining one or more values for the first data unit from the one or more data sources may include opening a connection to the first data source for receiving one or more values for the first data unit and maintaining the connection in an open state for receiving one or more values for other data units of the number of data units. Obtaining one or more values for the first data unit from the one or more data sources may include receiving one or more values for the first data unit from a previously opened connection to the first data source.

In another general aspect, a computing system for applying a rule to data from one or more data sources includes means for receiving data from a first data source and means for processing a number of data units derived at least in part from the data received from the first data source in a selected one of at least two different modes of applying the rule. The modes include a first mode in which the number of data units are received in a particular order, and processing the number of data units includes, for each of at least some of the number of data units, writing an updated value to at least one state variable based on a result of applying the rule to the data unit and a second mode in which a selection of particular data unit of the number of data units is received. The processing includes (1) determining a first set of data units that includes an ordered subset of data units from the number of data units, each data unit included in the ordered subset occurring before the particular data unit in the number of data units, (2) prior to applying the rule to the particular data unit, updating at least one state variable to a state that would result from processing the first set of data units in the first mode, and (3) applying the rule to the particular data unit including reading the updated value of the state variable.

In another aspect, in general, software stored in a non-transitory form on a computer-readable medium, for applying a rule to data from one or more data sources, includes instructions for causing a computing system to receive data from a first data source and process a number of data units derived at least in part from the data received from the first data source in a selected one of at least two different modes of applying the rule. The modes include a first mode in which the number of data units are received in a particular order, and processing the number of data units includes, for each of at least some of the number of data units, writing an updated value to at least one state variable based on a result of applying the rule to the data unit and a second mode in which a selection of particular data unit of the number of data units is received. Processing the particular data unit includes: (1) determining a first set of data units that includes an ordered subset of data units from the number of data units, each data unit included in the ordered subset occurring before the particular data unit in the number of data units, (2) prior to applying the rule to the particular data unit, updating at least one state variable to a state that would result from processing the first set of data units in the first mode, and (3) applying the rule to the particular data unit including reading the updated value of the state variable.

In another aspect, in general, a method for applying a rule to data from one or more data sources includes receiving data from a first data source and processing a number of data units derived at least in part from the data received from the first data source in a selected one of at least two different modes of applying the rule. The modes include a first mode in which the number of data units are received in a particular order, and processing the number of data units includes, for each of at least some of the number of data units, writing an updated value to at least one state variable based on a result of applying the rule to the data unit and a second mode in which a selection of particular data unit of the number of data units is received. Processing the particular data unit includes: (1) determining a first set of data units that includes an ordered subset of data units from the number of data units, each data unit included in the ordered subset occurring before the particular data unit in the number of data units, (2) prior to applying the rule to the particular data unit, updating at least one state variable to a state that would result from processing the first set of data units in the first mode, and (3) applying the rule to the particular data unit including reading the updated value of the state variable.

Aspects can include one or more of the following advantages.

Some aspects described herein improve performance and functionality of the system for specifying and applying rules as compared to conventional systems while ensuring that consistent results are produced when the system applies rules in single unit testing mode, batch testing mode, and production mode, as described in more detail below.

In contrast to some conventional systems, aspects described herein do not require a static testing environment. This can be advantageous because aspects can work effectively with complex event processing and are less likely to cause developers to change the way they write rules to conform to the static testing environment.

Other features and advantages of the invention will become apparent from the following description, and from the claims.

DESCRIPTION OF DRAWINGS

FIG. 4 is a diagram of a first step in a batch application of a rule.

FIG. 5 is a diagram of a second step in a batch application of a rule.

FIG. 11 is a user interface for configuring a system for complex event processing.

DESCRIPTION

1 Overview

Figure 1:
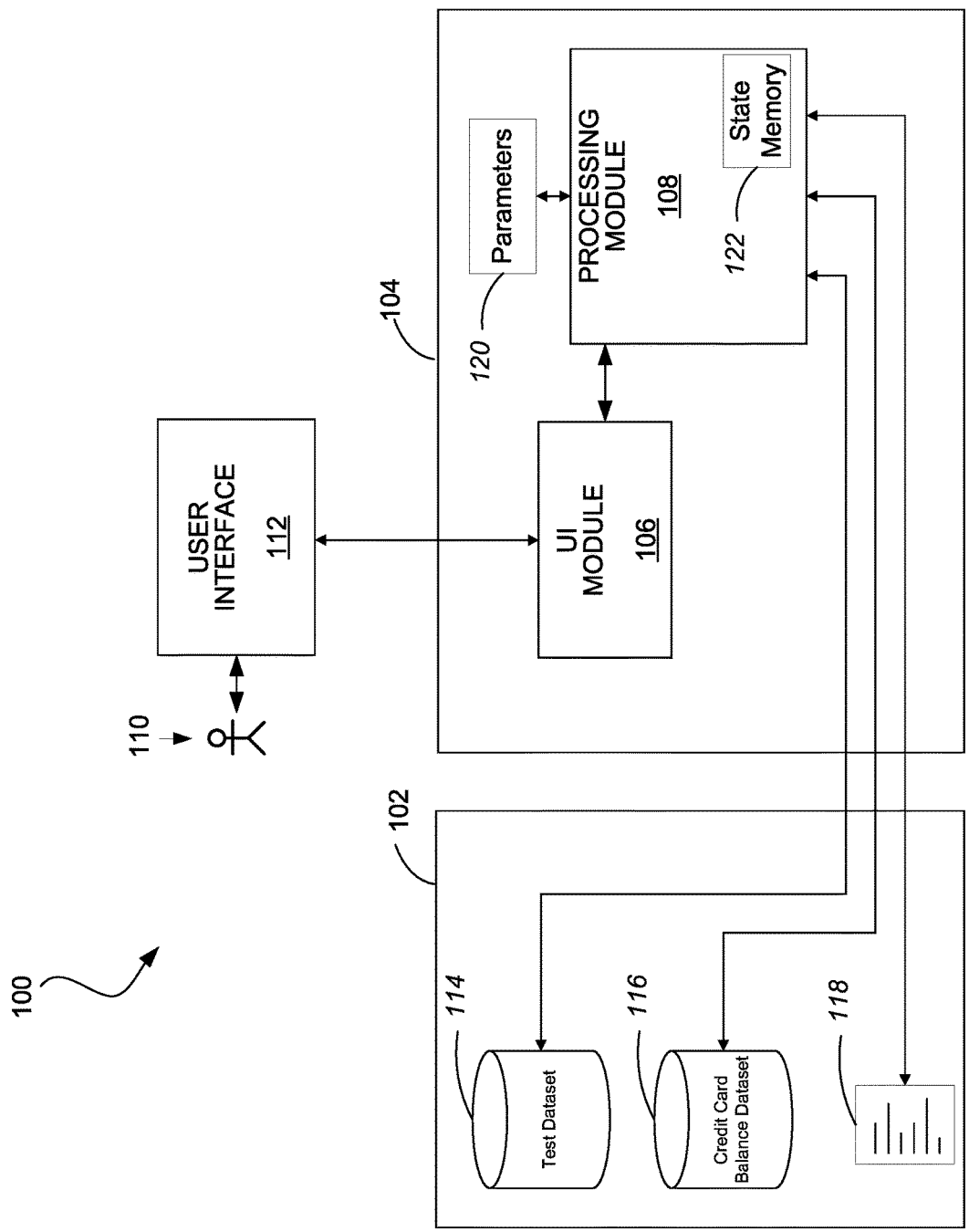
FIG. 1 is a block diagram of a system for specifying and applying rules to data.

FIG. 1 shows an example of a data processing system 100 that allows a developer 110 to specify data processing rules (sometimes referred to as "business rules") for application to data (e.g., database records) from one or more sources of data. Since it is important that the data processing rules specified by the developer 110 function correctly prior to being released into a production environment, the system 100 is configured to allow the developer 110 to test the functionality of the data processing rules against test data prior to releasing the data processing rules. In some examples, the system 100 allows the developer 110 to test the functionality of the data processing rules in either a single unit testing mode or in a batch testing mode. In the single unit testing mode, a data processing rule specified by the developer 110 is applied to one test data unit at a time. In the batch testing mode, the data processing rules specified by the developer 110 are applied to multiple test data units at a time.

The system 100 includes a data source 102 for supplying data to the system 100, a user interface 112 (e.g., a graphical view on a display screen) for specifying data processing rules, and an execution module 104 for applying the data processing rules to the data supplied by the data source 102.

1.1 Data Source

In general, the data source 102 includes one or more sources of data such as storage devices or connections to online data streams, each of which may store or provide data in any of a variety of formats (e.g., database tables, spreadsheet files, flat text files, or a native format used by a mainframe). In the exemplary system 100 of FIG. 1, the data source 102 includes a test dataset 114, a credit card balance dataset 116, and a number of recent purchases archive 118. It is noted that the above described set of data sources included in the data source 102 is just one example of a set of data sources that may be included in the data source 102. Indeed, depending on the specific application of the system 100, many different types of data sources with different types of data content can be included in the data source 102.

At least some of the datasets included in the data source 102 include a number of records (e.g., records formatted according to a predetermined record structure, or rows in a database table). Each element of the number of records can include values for a number of fields (e.g., attributes defined within a record structure, or columns in a database table) (e.g., "first name," "last name," "email address," etc.), possibly including null or empty values.

In some examples, one of the sources of data included in the data source 102 is designated as a primary source of data and other sources of data included in the data source 102 are designated as auxiliary data sources of data that are related to the primary source of data. Very generally, data processing rules are applied to at least some fields of each record of a predefined set of records in the primary data source. During application of the data processing rules to the records of the primary data source, the auxiliary data sources are accessed to obtain other values or even other records that are related to the records from the primary data source and are required by the data processing rules. For example, each record of the primary dataset may include a key (e.g., an account number), which is used to access related data from the auxiliary data sources. The data from the primary data source and the auxiliary data sources can be collected for testing as a unit, referred to as a "test data unit," as described in more detail below. In the exemplary system of FIG. 1, the primary data source is the test dataset 114 and the auxiliary data sources included in the data source 102 are the credit card balance dataset 116, and the number of recent purchases archive file 118.

As is described in greater detail below, the system 100 is configured to be able to dynamically access the auxiliary data sources during development and testing of the data processing rules, instead of requiring fixed test values to be determined and stored before development and testing begin, as a static simulation of the auxiliary data sources.

1.2 User Interface

The user interface 112, which is described in greater detail below with reference to FIG. 2, enables the developer 110 to specify a set of data processing rules that are used to process test data units. The output of the user interface 112 is a specification of one or more data processing rules. The specification of one or more data processing rules generated by the user interface 112 is provided to the execution environment 104.

1.3 Execution Environment

The execution environment 104 includes a user interface (UI) module 106, a processing module 108, and a set of parameters 120. The processing module 108 includes a state memory 122. In some examples, the set of parameters 120 and the state memory 122 serve as additional auxiliary data sources that can be dynamically accessed during the application of data processing rules.

The specification of one or more data processing rules from the user interface 112 is provided to the UI module 106, which transforms (e.g., compiles or interprets) the specified data processing rules into a form that is usable by the processing module 108. The processing module 108 receives the usable form of the data processing rules, the set of parameters 120, and data units from the data source 102 as input and processes the data units from the data source 102 according to the data processing rules and the set of parameters 120. In some examples, the state memory 122 preserves state from one test data unit to the next when processing the data from the data source 102, as is described in greater detail below. The results of processing the data from the data source 102 are provided back to the UI module 106 and then back to the user interface 112 where they are presented to the developer 110.

The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

Storage devices providing the data source 102 may be local to the execution environment 104, for example, being stored on a storage medium connected to a computer hosting the execution environment 104 (e.g., a hard drive), or may be remote to the execution environment 104, for example, being hosted on a remote system (e.g., a mainframe) in communication with a computer hosting the execution environment 104, over a remote connection (e.g., provided by a cloud computing infrastructure).

2 Exemplary User Interface

Figure 2:
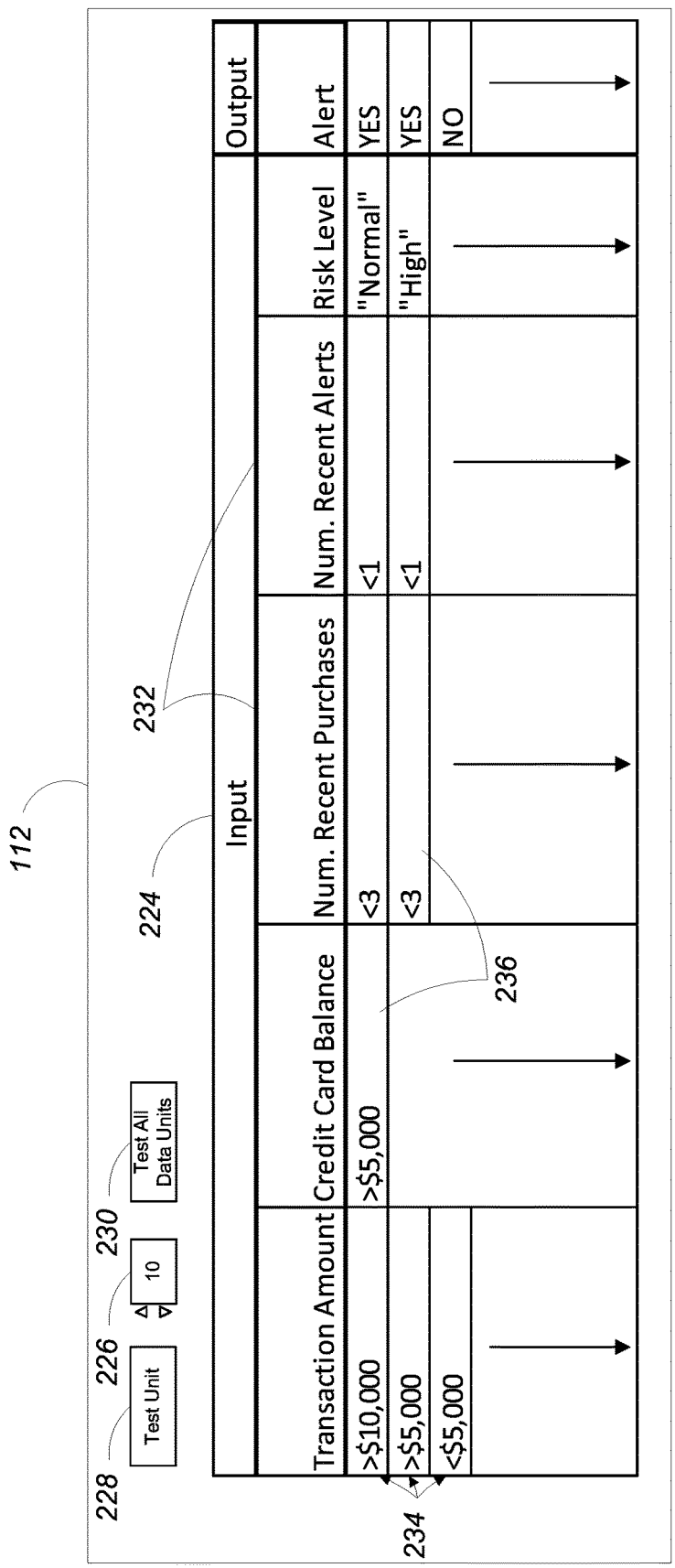
FIG. 2 is a user interface for specifying and applying rules to data.

Referring to FIG. 2, one example of the user interface 112 is configured to allow the developer 110 to specify and test data processing rules. The user interface 112 is rendered by the UI module 106 (e.g., on a computer monitor) and includes a two-dimensional grid 224, a data unit number control 226, a single unit test control 228, and a batch test control 230. Very generally, the developer 110 can specify a data processing rule using the two-dimensional grid 224 and can then test the data processing rule on either a single test data unit (specified by the data unit number control 226) using the single unit test control 228 or on an entire set of test data units using the batch test control 230. Alternatively, in some implementations, after the developer 110 changes the data unit specified by the data unit number control 226, the UI module 106 will automatically initiate a test of the data processing rule on the selected test data unit in response to that selection without the developer 110 having to input an explicit command.

The two-dimensional grid 224 includes a number of columns 232 and a number of rows 234. The columns 232 are divided into two column types: input columns and output columns. In the example of FIG. 2, the two-dimensional grid 224 includes five input columns: a Transaction Amount column, a Credit Card Balance column, a Num. Recent Purchases column, a Num. Recent Alerts column, and a Risk Level column. Very generally, each input column may be associated with a field from the primary input dataset 114, or a field from an auxiliary data source 102, from which a field value may be obtained (e.g., for use as a raw value or as part of an expression). In some examples, each set of values for the fields associated with the input columns is referred to as a "test data unit." In some examples, input columns can be associated with values from sources other than fields, such as a temporary variable, a constant, or other free-form input value.

In the example of FIG. 2, the two-dimensional grid 224 includes a single output column: Alert. In some examples, the Alert output column triggers an event (e.g., sending a text message) based on a value of its output.

At least some of the cells 236 at the intersections of the rows 234 and the input columns of the two-dimensional grid 224 include a constraint. In some examples, at least some of the constraints represent a comparison (e.g., greater than, less than, or equal to) between a value of a field for a given data unit from a data source 102 and a comparison value (e.g., a dollar amount). Together the constraints in the cells of a given row of the two-dimensional grid 224 define a rule case and each output value defines an output of the rule if the rule case is satisfied. In general, for a rule case to be satisfied, all of the constraints for the rule case must be satisfied.

In the Example of FIG. 2, the first row defines a first rule case and a first output
value as follows:
if the value of the Transaction Amount input data is greater than $10,000 AND
the value of the Credit Card Balance input data is greater than $5,000 AND
the value of the Num. Recent Purchases input data is less than 3 AND
the value of the Num. Recent Alerts input data is less than 1 AND
the Risk Level is equal to "Normal," THEN
the Alert status output will be assigned the value "YES."
Similarly, the second row defines a second rule case and a second output value as follows:
if the value of the Transaction Amount input data is greater than $5,000 AND
the value of the Credit Card Balance input data is greater than $5,000 AND
the value of the Num. Recent Purchases input data is less than 3 AND
the value of the Num. Recent Alerts input data is less than 1 AND
the Risk Level is equal to "High," THEN
the Alert status output will be assigned the value "YES."
Finally, the third row defines a third rule case and a third output value as follows:
if the value of the Transaction Amount input data is less than $5,000 THEN the Alert status output will be assigned the value "NO."

Any other rows represent a default rule case with a default output value of "NO" as indicated by the downward pointing arrows, which signify (for both input and output columns) that the cell value at the top of the arrow is repeated for all cells in the box containing the arrow.

3 Data Processing Rule Application

As is mentioned above, to apply a data processing rule to one or more data units from the sources of data in the data source 102, the user interface 112 provides the specification of the data processing rule to the UI module 106. The UI module 106 processes the specification of the data processing rule into a form that is usable by the processing module 108 (e.g., via compilation, interpretation, or some other transformation). The usable form of the data processing rule is then provided to the processing module 108 along with the one or more records or other values from the data source 102 to provide the input for one or more data units. The processing module 108 applies the data processing rule to the one or more data units and returns one or more output values.

In general, the rule cases defined in the rows 234 of the two-dimensional grid 224 are ordered by priority such that rule cases with a lower row number (e.g., the first row) have a higher priority than the rule cases with higher row numbers (e.g., the second row). The priorities associated with the rows 234 of the two-dimensional grid 224 are taken into account when the processing module 108 applies the rule. As such, the rule case defined in the first row is tested first. If the rule case defined in the first row is satisfied (sometimes referred to as triggered), then the output values defined in the first row are returned and application of the rule finishes without testing the rule cases defined in rows with lower priority. If the rule case defined in the first row is not satisfied, then the processing module 108 tests the rule case defined in the second row. If the rule case defined in the second row is satisfied, then the output values defined in the second row are returned and application of the rule finishes without testing the rule cases defined in rows with lower priority. The processing module 108 repeats this process until a rule case defined in a lowest priority row of the two-dimensional grid 224 is tested and default output values defined in the lowest priority row of the two-dimensional grid 224 are returned.

4 Presentation of Test Results

In some examples, the one or more output values returned by the processing module 108 are provided to the UI module 106, which in turn provides the one or more output values to the user interface 112 for presentation to the developer 110. The developer 110 can then view the result of applying the data processing rule (e.g., one or more output values) in the user interface 112 to determine whether the data processing rule conforms to a desired functionality. If necessary, the developer 110 may make changes to the data processing rule using via user interface 112. This capability for interactive feedback is facilitated by the approaches described herein for obtaining consistent results in single unit testing mode, batch testing mode, and production mode.

5 Inter-Test Data Unit Dependency

Figure 3:
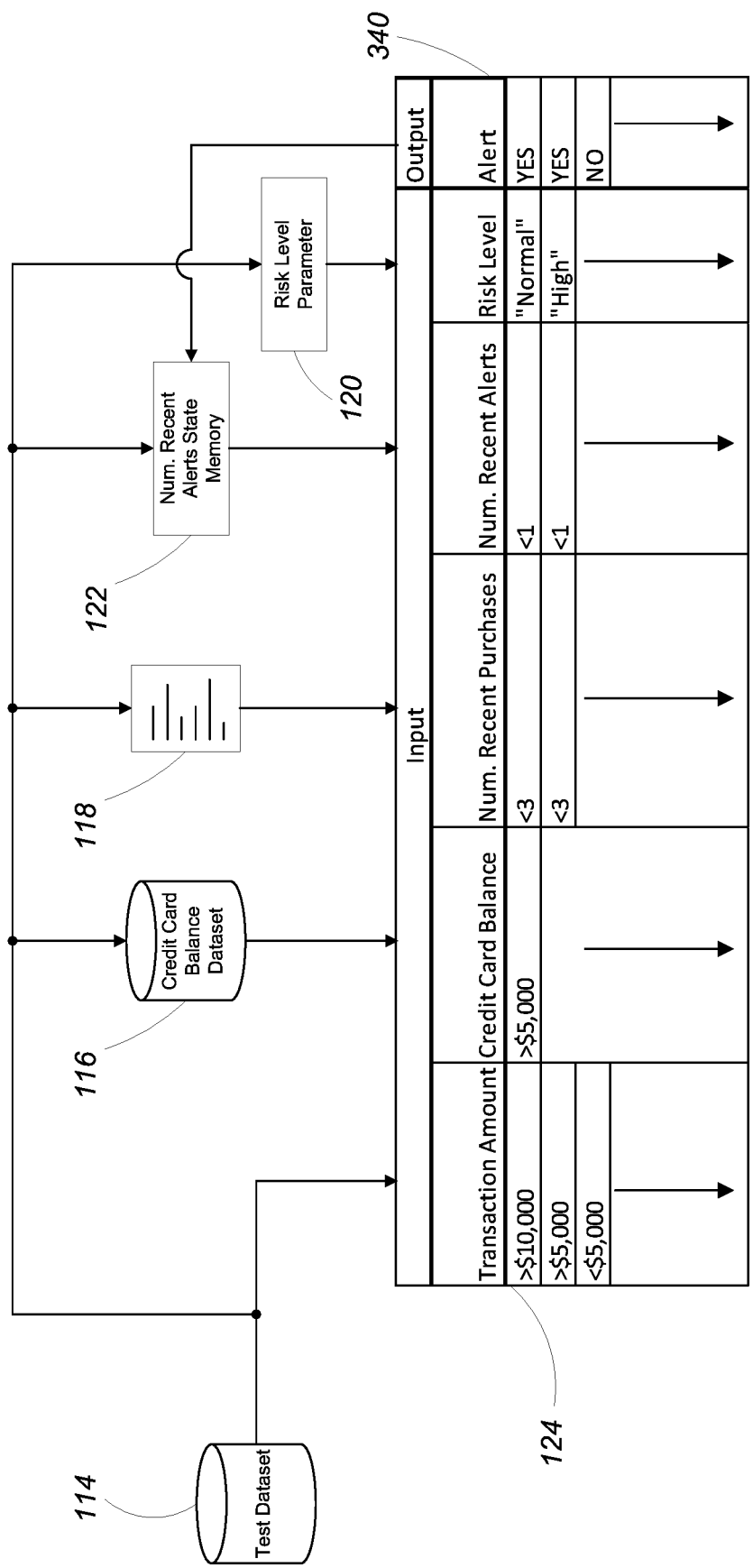
FIG. 3 is a block diagram illustrating an association of elements of the user interface to data sources.

As is noted above, in some examples, the fields associated with columns of the two-dimensional grid 224 of the user interface 112 can be derived from a variety of auxiliary data sources, some included in the data source 102 and some included in or otherwise accessible from within the execution environment 104. Referring to FIG. 3, the two-dimensional grid 224 for the exemplary data processing rule of FIG. 2 is shown along with the various exemplary data sources from which the fields associated with the columns 232 of the two-dimensional grid 224 are derived. Note that the data sources shown in FIG. 3 are included only for illustrative purposes and would not normally be displayed to the developer 110 via the user interface 112.

In FIG. 3, the Transaction Amount field associated with the first column of the two-dimensional grid 224 is derived from a corresponding field in records appearing within the test dataset 114, the Credit Card Balance field associated with the second column of the two-dimensional grid 224 is derived from a corresponding field in records appearing within the credit card balance dataset 116, the Num. Recent Purchases field associated with the third column of the two-dimensional grid 224 is derived from the recent purchases archive 118 (e.g., an archive such as an indexed compressed flat file (ICFF), as described in more detail in U.S. Pat. No. 8,229,902, incorporated herein by reference), the Num. Recent Alerts field associated with the fourth column of the two-dimensional grid 224 is derived from a value stored in the state memory 122, and the Risk Level field associated with the fifth column of the two-dimensional grid 224 is derived from a parameter value from the set of parameters 120. Note that, in the example of FIG. 3, the test dataset 114 is the primary data source and the credit card balance dataset 116, the recent purchases archive 118, the state memory, and the external parameter 120 are all auxiliary data sources. Also note that information (e.g., a key) from the records of the test dataset 114 is supplied to the auxiliary data source such that they can access auxiliary data related to the records of the test dataset 114.

As is illustrated in FIG. 3, in some examples, the output values for certain output columns may be used to update the data sources associated with certain input columns. For example, the output value of the Alert output column 340 in FIG. 3 is used to update the state memory 122 from which the fourth input column, titled Num. Recent Alerts derives its input data. That is, when the result of applying the rule specified by the two-dimensional grid 224 of FIG. 3 results in an Alert value of YES, the Num. Recent Alerts field in the state memory 122 is incremented, indicating that an Alert has recently been issued. By writing the output of rule applications into data sources that are used as input to the data processing rule, inter-data unit dependencies may be established between different test data units.

For test data units with inter-data unit dependencies, the result of an application of a data processing rule to a first test data unit 450 depends on the results of applying the data processing rule to one or more other, different test data units.

6 Batch Testing

When applying a data processing rule to test data units in a batch testing mode, the data processing rule is applied to the test data units in a predefined order (usually associated with the values in the test data units that are derived from the primary data source), as would be done in a data processing system deployed in a production environment and running in production mode. For each application of the data processing rule of FIG. 2 to a test data unit, an Alert output value is generated and the state memory 122 is updated based on the Alert output value. Since batch testing processes all test data units beginning from a first test data unit (of predefined a subset of test data units), for a given test data unit, all of the prior test data units have had the data processing rule applied to them. As such, the state memory 122 reflects the Alert output values generated by the application of the data processing rule to the prior test data units.

Figure 6:
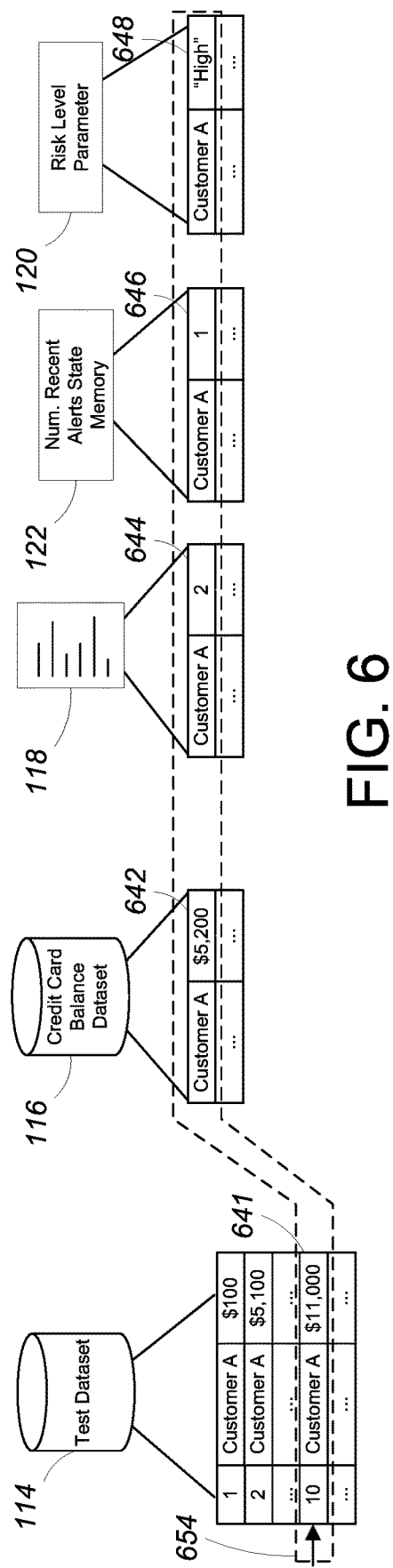
FIG. 6 is a diagram of a third step in a batch application of a rule.

FIGS. 4-6, illustrate an exemplary application of the data processing rule of FIG. 2 in batch testing mode to a batch of test data units for a given customer identified by a customer account key value (labeled in this example as "Customer A," "Customer B," etc.). In this example, each test data unit includes a transaction amount for a given customer derived from the primary test dataset 114 and a number of auxiliary values, including the customer's credit card balance, a number of recent purchases for the customer, a number of recent alerts issued for the customer, and a risk level parameter for the customer, derived from the auxiliary data sources 116, 118, 120, 122. The number of recent alerts is stored in different respective state variables within memory 122 for different customers. The test data units for different customers may be interleaved within the batch of test data units being tested. In this example, it is assumed that test data units with ordering key values 1, 2, and 10 are for Customer A, and test data units with ordering key values 3 to 9 are for other customers.

Referring to FIG. 4, a first test data unit 450 for Customer A (with an ordering key value of 1) includes a first transaction amount 441 of $100, a credit card balance 442 of $0, a number of recent purchases value 444 of 0, a number of recent alerts value 446 of 0, and a risk level parameter value 448 of "High." To apply the data processing rule specified in FIG. 2, the processing module 108 first applies the first rule case of the data processing rule to the first test data unit 450. One requirement for satisfying the first rule case is that the transaction amount 441 must be greater than $10,000. Since the transaction amount 441 for the first test data unit 450 is $100, the first rule case is not satisfied by the first test data unit 450. The processing module 108 then applies the second rule case of the data processing rule to the first test data unit 450. One requirement for satisfying the second rule case is that the transaction amount 441 must be greater than $5,000. Since the transaction amount 441 for the first test data unit 450 is $100, the second rule case is not satisfied by the first test data unit 450. Finally, the processing module 108 applies the third rule case of the data processing rule to the first test data unit 450. The only requirement for satisfying the third rule case is that the transaction amount 441 be less than $5,000. Since the transaction amount 441 for the first test data unit 450 is $100, the third rule case is satisfied. Since the third rule case is associated with an Alert value of "NO," the application of the data processing rule to the first test data unit 450 results in an Alert output value of "NO." Since an Alert output value of "NO" is output, the number of recent alerts is not incremented in the state memory 122 and remains at 0.

In general, one or more other processes update the value of Customer A's credit card balance 442 in the credit card balance dataset 116 and the value of Customer A's number of recent purchases 444 in the number of recent purchases archive 118 based on the first transaction in the test dataset 114.

Referring to FIG. 5, a second test data unit 552 for Customer A (with an ordering key value of 2) includes a second transaction amount 541 of $5,100, a credit card balance 542 of $100, a number of recent purchases value 544 of 1, a number of recent alerts value 546 of 0, and a risk level parameter value 548 of "High." To apply the data processing rule specified in FIG. 2, the processing module 108 first applies the first rule case of the data processing rule to the second test data unit 552. One requirement for satisfying the first rule case is that the transaction amount 541 must be greater than $10,000. Since the transaction amount 541 for the second test data unit 552 is $5,100, the first rule case is not satisfied by the second test data unit 552. The processing module 108 then applies the second rule case of the data processing rule to the second test data unit 552. Since the transaction amount 541 is greater than $5,000, the number of recent purchases value 544 is less than 3, the number of recent alerts value 546 is less than 1, and the risk level value 548 is "HIGH" in the second test data unit 552, the second rule case is satisfied. Since the second rule case is associated with an Alert value of "YES," the application of the data processing rule to the second test data unit 552 results in an Alert output value of "YES." As is described above, since the application of the data processing rule resulted in an Alert output value of "YES," the Num. Recent Alerts state memory 122 is incremented a value of 1 to indicate that an Alert was recently issued.

Test data units with ordering key values 3 to 9 have been sequentially processed after the test data unit with ordering key value 2, without changing the number of recent alerts value 646 for Customer A, since the processing of previous data units only affect the stored state for later data units with matching customer account key values.

Referring to FIG. 6, a third test data unit 654 for Customer A (with an ordering key value of 10) includes a third transaction amount 641 of $11,000, a credit card balance 642 of $5,200, a number of recent purchases value 644 of 2, a number of recent alerts value 646 of 1, and a risk level parameter value 648 of "High." To apply the data processing rule specified in FIG. 2, the processing module 108 first applies the first rule case of the data processing rule to the third test data unit 654. One requirement for satisfying the first rule case is that the number of recent alerts 646 must have a value of less than 1. Since the number of recent alerts value 646 for the third test data unit 654 is 1, the first rule case is not satisfied by the third test data unit 654. The processing module 108 then applies the second rule case of the data processing rule to the third test data unit 654. One requirement for satisfying the second rule case is that the number of recent alerts 646 must have a value of less than 1. Since the number of recent alerts value 646 for the third test data unit 654 is 1, the second rule case is not satisfied by the third test data unit 654. Finally, the processing module 108 applies the third rule case of the data processing rule to the third test data unit 654. The only requirement for satisfying the third rule case is that the transaction amount 641 be less than $5,000. Since the transaction amount 641 for the third test data unit 654 is $11,000, the third rule case is not satisfied. With none of the rule cases satisfied, the data processing rule returns a default Alert output value of "NO."

7 Single Unit Testing

In some examples, rather than applying the data processing rule to the test data units in batch testing mode the developer 110 may apply the data processing rule to a single, selected test data unit corresponding to a selected key value of a record from the middle of the test dataset 114. In such cases, an erroneous output of the data processing rule may occur if values of the test data unit do not accurately reflect the state resulting from applying the data processing rule to values or data units occurring prior to the selected data unit according to a predetermined order.

To avoid such erroneous output, the processing module 108 is configured to process the selected test data unit by determining a subset of test data units that occur prior the selected data unit. In general, the test data units in the subset of test data units are associated with a predetermined order (e.g., a sort order of a unique primary key field from records in the test dataset 114, or a storage order of the records in the test dataset 114). In some examples, the test data units in the subset of test data units are all related by a common identifier (e.g., a value of a non-unique key field from records in the test dataset 114, such as a customer account number field). Prior to applying the data processing rule to the selected test data unit, the processing module iterates through the test data units of the subset of test data units in the predetermined order and applies the data processing rule to each test data unit. For at least some applications of the data processing rule to the test data units, an output generated by the application of the data processing rule is used to update a state variable.

After the data processing rule has been applied to all of the test data units of the subset of test data units, the updated value of the state variable is read and used in the application of the data processing rule to the selected test data unit.

By ensuring that the data processing rule has been applied to all test data units occurring prior to the selected test data unit, it is ensured that the value of the state variable and therefore the output of the data processing rule is accurate, in terms of being consistent with results that would be obtained in batch testing mode and in production mode.

Figure 7:
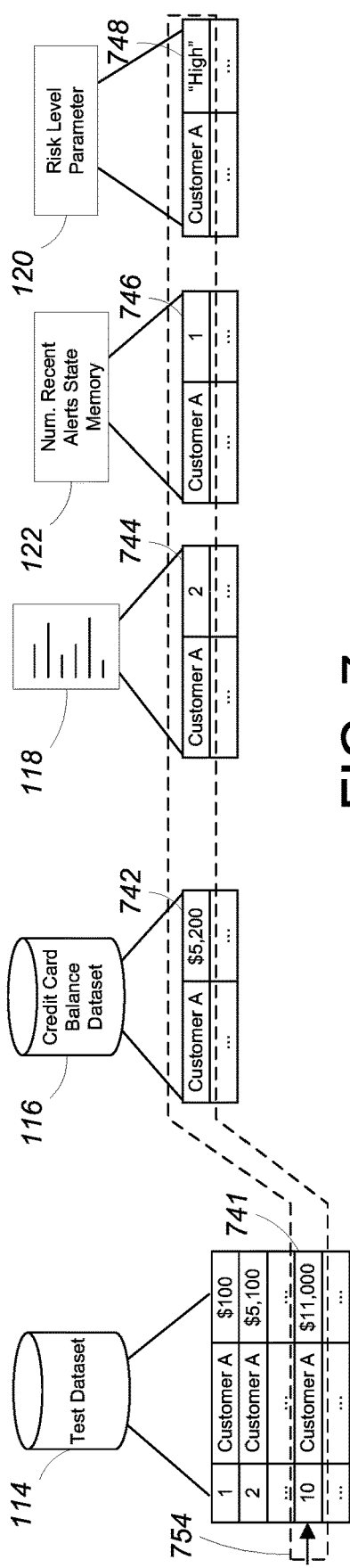
FIG. 7 is a diagram of a third step in a single unit application of a rule.

Referring to FIGS. 2 and 7-9, one example of single unit testing mode processing is illustrated. In FIG. 2, the developer 110 has selected an ordering key value of 10 using the data unit number control 226. By pressing the single unit test control 228, the developer 110 indicates a desire to apply the data processing rule to a selected test data unit associated with the 10$^{th}$ record of the test dataset 114. Referring to FIG. 7, simply reading the values of the fields for each of the input columns 232 of the two-dimensional grid 224 for a selected test data unit 754 from their respective data sources and applying the data processing rule to those values would result in an incorrect Alert output value of "YES" for the selected test data unit 754, since the second rule case of the data processing rule is incorrectly satisfied due to an inaccurate value in the Num. Recent Alerts field of the test data unit.

In this example, it is also assumed that test data units with ordering key values 1, 2, and 10 are for Customer A, and test data units with ordering key values 3 to 9 are for other customers. So, the Alert output value for the selected test data unit 754 (with ordering key value 10) depends on a result of applying the data processing rule to a first test data unit (with an ordering key value of 1) and a second test data unit (with an ordering key value of 2), which are associated with a first record and a second record of the test dataset 114, respectively. The first test data unit and the second test data unit may not have yet had the data processing rule applied. In this example, without having applied the data processing rule to the first and second data units, the value of the Number of Recent Alerts field stored in the state memory 122 for Customer A is inaccurate (according to an intended behavior that is consistent with batch testing mode and production mode).

Figure 8:
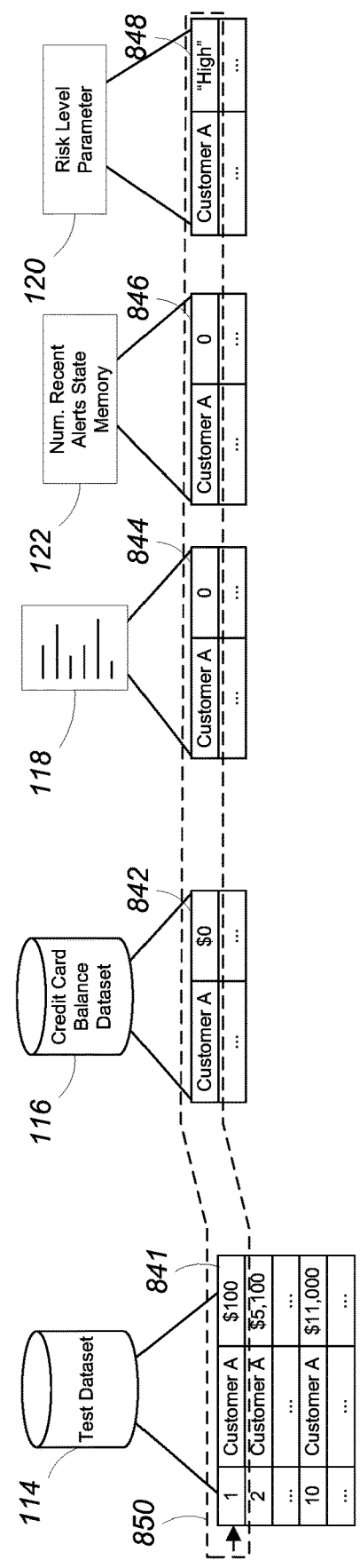
FIG. 8 is a diagram of a first step in a single unit application of a rule.
Figure 9:
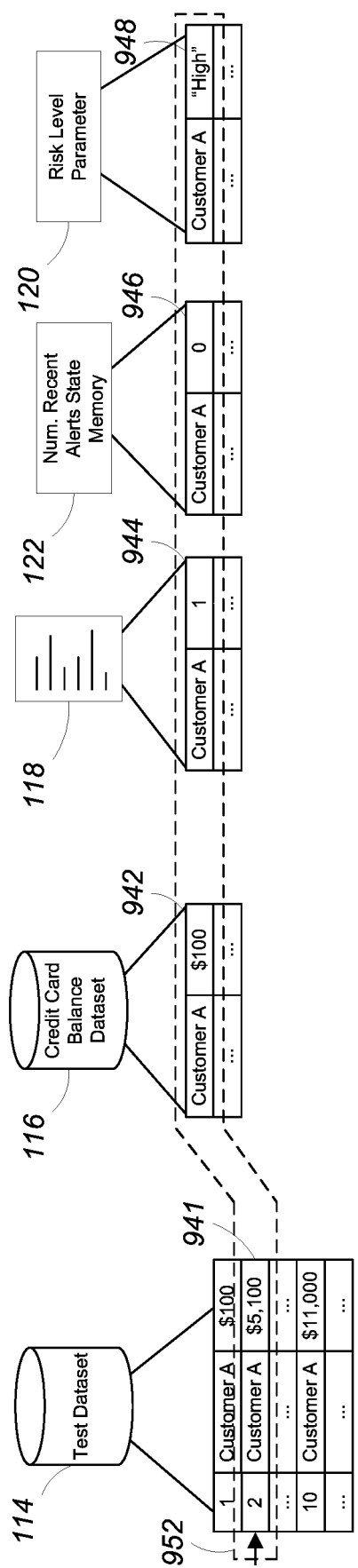
FIG. 9 is a diagram of a second step in a single unit application of a rule.

Referring to FIGS. 8 and 9, in order to ensure that the value of the Number of Recent Alerts field stored in the state memory 122 is accurate prior to application of the data processing rule to the selected test data unit 754, the system 100 first applies the data processing rule to the first test data unit 850 (with an ordering key value of 1) and to the second test data unit 952 (with an ordering key value of 2).

Referring to FIG. 8, applying the data processing rule to the first test data unit 850 results in an Alert output value of "NO" (as was the case in FIG. 4). Since an Alert output value of "NO" is output, the number of recent alerts is not incremented in the state memory 122 and remains at 0. Referring to FIG. 9, applying the data processing rule to the second test data unit 952 results in an alert output value of "YES" (as was the case in FIG. 5). Since the application of the data processing rule resulted in an Alert output value of "YES," the Num. Recent Alerts value in the state memory 122 is incremented a value of 1 to indicate that an Alert was recently issued. Finally, referring back to FIG. 7, applying the data processing rule to the selected test data unit 754 results in default Alert output value of "NO" being returned (as was the case in FIG. 6) since the Num. Recent Alerts value in the state memory 122 includes an accurate value.

8 Complex Event Processing

Some types of data processing systems may especially benefit from the dynamic testing environment enabled by the techniques described herein for obtaining consistent results in single unit testing mode, batch testing mode, and production mode. One such type of data processing is complex event processing. For example, the processing module 108 of FIG. 1 can be configured to implement complex event processing routines. Very generally, a complex event processing system processes events by combining data from multiple sources to identify patterns in the relationships between the events. In some examples, complex event processing systems process incoming events using a recent event history to identify meaningful events such as marketing opportunities or threats and to respond to the identified meaningful events as quickly as possible.

Figure 10:
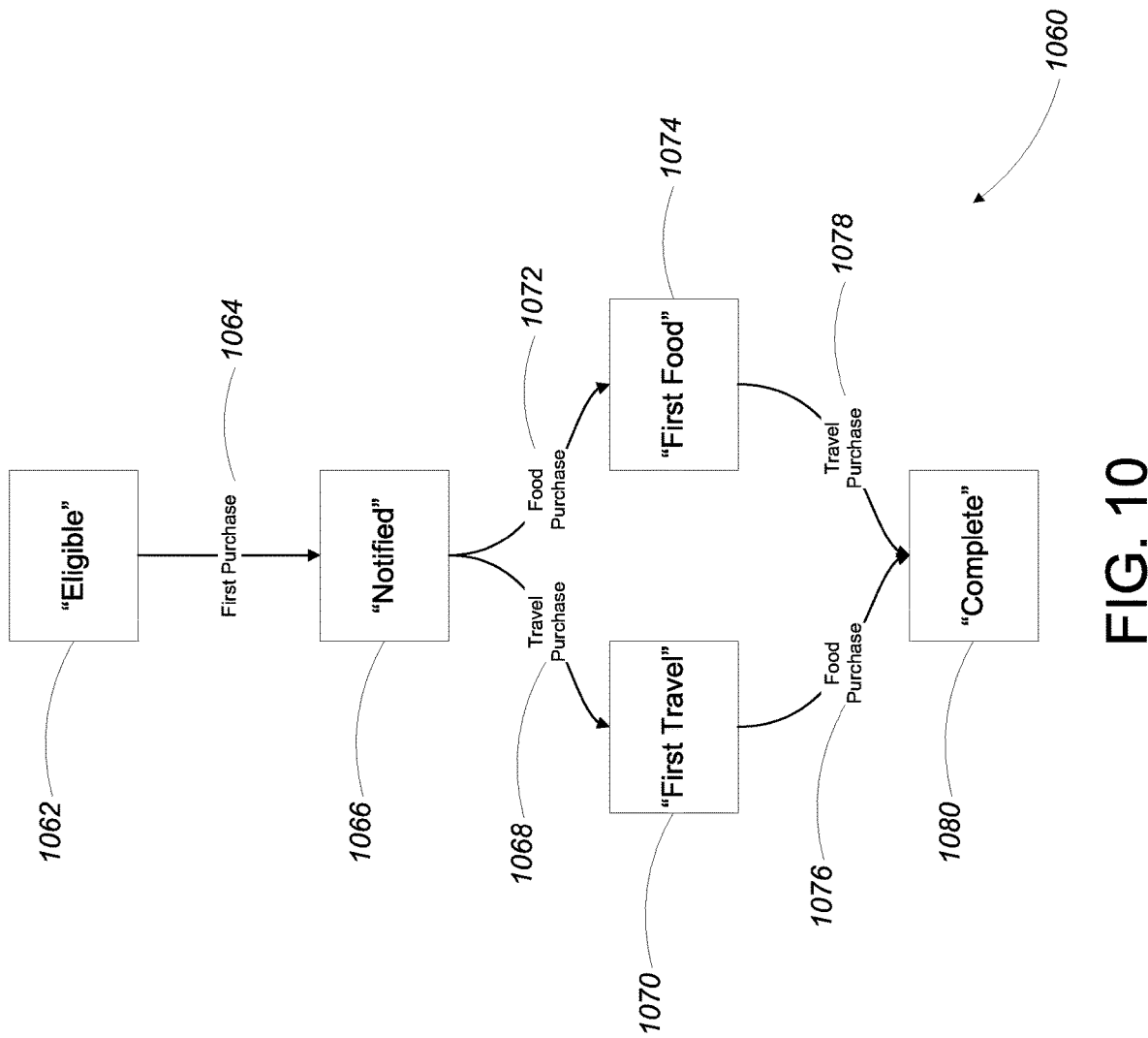
FIG. 10 is a state diagram of an exemplary complex event processing routine.

Referring to FIG. 10, a state diagram 1060 for an exemplary complex event processing routine, a marketing campaign, is shown. The marketing campaign is intended to increase credit card use by notifying customers about cash back programs. In the exemplary marketing campaign, customers are offered cash back incentives based on both a current purchase event as well as one or more previous purchase events. The state diagram 1060 includes a number of states 1062, 1066, 1070, 1074, 1080 interconnected by state transitions 1064, 1068, 1072, 1076, 1078. When a purchase event is received for a representative customer, the customer's state is updated based on the customer's current state and the nature of the received purchase event.

In particular, at the beginning of the exemplary marketing campaign, if the customer is deemed eligible for the marketing campaign, the customer is placed into an "Eligible" state 1062 (e.g., by writing an indication of the "Eligible" state 1062 into a state variable in the state memory 122 of FIG. 1).

When a first purchase event 1064 is received for the customer, the customer's current state is read (e.g., from the state variable in the state memory 122 of FIG. 1). Since the customer is currently in the "Eligible" state 1062 and they have received a first purchase event 1064, a message (not shown) is sent to the customer to inform them that they are eligible for the marketing campaign, which includes cash back promotions for travel related purchases and food related purchases. The customer's state is then transitioned to a "Notified" state 1066, indicating that the customer has been notified of the marketing campaign.

While in the "Notified" state 1066, if a travel related purchase event 1068 is received, a message is sent to the customer to inform them that they have received a travel related promotion and that they are eligible for a food related promotion. The customer's state is then transitioned to a "First Travel" state 1070, indicating that the customer has received a travel related promotion.

Alternatively, while in the "Notified" state 1066, if a food related purchase event 1072 is received, a message is sent to the customer to inform them that they have received a food related promotion and they are eligible for a travel related promotion. The customer's state is then transitioned to a "First Food" state 1074, indicating that the customer has received a food related promotion.

While in the "First Travel" state 1070, if a food related purchase event 1076 is received, a message is sent to the customer to inform them that they have received both a travel related promotion and a food related promotion. The customer's state is then transitioned to a "Complete" state 1080, indicating that the customer has completed the promotion.

Similarly, while in the 'First Food' state 1074, if a travel related purchase event 1078 is received, a message is sent to the customer to inform them that they have received both a travel related promotion and a food related promotion. The customer's state is then transitioned to the "Complete" state 1080, indicating that the customer has completed the promotion.

8.1 Complex Event Processing Configuration User Interface

Referring to FIG. 11, an exemplary user interface 1182 allows a user to configure a system (e.g., the processing module 108 of FIG. 1) to implement complex event processing routine such as that specified by the state diagram 1060 of FIG. 10. Very generally, the user interface allows a user to express a state diagram for a complex event processing routine as an ordered set of tests, each test having a corresponding output that occurs if the test is satisfied.

In some examples, the user interface 1182 is implemented as a two-dimensional grid 1183 of cells including a number of columns 1186 and a number of rows 1184. A cell exists at the intersection of each row 1184 and column 1185 and is configured to accept a user input (e.g., a parameter value).

The columns 1186 are divided into two column types: "trigger" columns 1188 and "output" columns 1190. In the user interface 1182 of FIG. 11 there are three trigger columns 1188 (i.e., Current State, Travel Related, and Classification) and two output columns 1190 (i.e., New State and Message).

Taken together, the cells in a given row that are associated with the trigger columns 1188 are used to define a test (e.g., a Boolean test). For example, in a first row 1185 of the two-dimensional grid 1183, a cell associated with the "Current State" trigger column includes the input value "Eligible," a cell associated with the "Travel Related" trigger column includes the input value "any," and a cell associated with the "Classification" trigger column includes the input value "any." Given the values for the trigger columns 1188 in the first row 1185, a new purchase event for a customer that is received by the system satisfies the test defined by the first row 1185 if the customer's current state (e.g., as read from a state variable storage) is "Eligible," regardless of whether or not the new purchase event is a travel related purchase event or a food related purchase event.

Each cell in a given row that is associated with an output column 1188 defines an output action that occurs if the test for the given row is satisfied. For example, in the first row 1185 of the two-dimensional grid 1183, a cell associated with the "New State" output column includes the value "Notified" and a cell associated with the "Message" output column includes an eligibility notification message 1192. Given the values for the output columns 1190 in the first row 1185, if the test defined by the first row 1185 is satisfied by the new purchase event for the customer, the customer's current state is updated (e.g., written to the state variable storage) to "Notified" and the eligibility notification message 1192 is sent to the customer.

In a second row 1187 of the two-dimensional grid 1183, a cell associated with the "Current State" trigger column includes the input value "Notified," a cell associated with the "Travel Related" trigger column includes the input value "Is Travel Related," and a cell associated with the "Classification" trigger column includes the input value "any." Given the values for the trigger columns 1188 in the second row 1187, a new purchase event for a customer that is received by the system satisfies the test defined by the second row 1187 if the customer's current state is "Notified," and the new purchase event is a travel related purchase event.

In the second row 1187 of the two-dimensional grid 1183, a cell associated with the "New State" output column includes the value "First Travel" and a cell associated with the "Message" output column includes a travel purchase notification message 1194. Given the values for the output columns 1190 in the second row 1187, if the test defined by the second row 1185 is satisfied by the new purchase event for the customer, the customer's current state is updated to "First Travel" and the travel purchase notification message 1194 is sent to the customer.

In a third row 1189 of the two-dimensional grid 1183, a cell associated with the "Current State" trigger column includes the input value "Notified," a cell associated with the "Travel Related" trigger column includes the input value "any", and a cell associated with the "Classification" trigger column includes the input value "Food and Drug." Given the values for the trigger columns 1188 in the third row 1189, a new purchase event for a customer that is received by the system satisfies the test defined by the third row 1189 if the customer's current state is "Notified," and the new purchase event is a food related purchase event.

In the third row 1189 of the two-dimensional grid 1183, a cell associated with the "New State" output column includes the value "First Food" and a cell associated with the "Message" output column includes a food purchase notification message 1196. Given the values for the output columns 1190 in the third row 1189, if the test defined by the third row 1189 is satisfied by the new purchase event for the customer, the customer's current state is updated to "First Food" and the food purchase notification message 1196 is sent to the customer.

In a fourth row 1191 of the two-dimensional grid 1183, a cell associated with the "Current State" trigger column includes the input value "First Travel," a cell associated with the "Travel Related" trigger column includes the input value "any", and a cell associated with the "Classification" trigger column includes the input value "Food and Drug." Given the values for the trigger columns 1188 in the fourth row 1191, a new purchase event for a customer that is received by the system satisfies the test defined by the fourth row 1191 if the customer's current state is "First Travel," and the new purchase event is a food related purchase event.

In the fourth row 1191 of the two-dimensional grid 1183, a cell associated with the "New State" output column includes the value "Complete" and a cell associated with the "Message" output column includes a campaign completion notification message 1198. Given the values for the output columns 1190 in the fourth row 1191, if the test defined by the fourth row 1191 is satisfied by the new purchase event for the customer, the customer's current state is updated to "Complete" and the campaign completion notification message 1198 is sent to the customer.

In a fifth row 1193 of the two-dimensional grid 1183, a cell associated with the "Current State" trigger column includes the input value "First Food," a cell associated with the "Travel Related" trigger column includes the input value "Is Travel Related," and a cell associated with the "Classification" trigger column includes the input value "any." Given the values for the trigger columns 1188 in the fifth row 1193, a new purchase event for a customer that is received by the system satisfies the test defined by the fifth row 1193 if the customer's current state is "First Food," and the new purchase event is a travel related purchase event.

In the fifth row 1193 of the two-dimensional grid 1183, a cell associated with the "New State" output column includes the value "Complete" and a cell associated with the "Message" output column includes a campaign completion notification message 1198. Given the values for the output columns 1190 in the fifth row 1193, if the test defined by the fifth row 1193 is satisfied by the new purchase event for the customer, the customer's current state is updated to "Complete" and the campaign completion notification message 1198 is sent to the customer.

Finally, in a sixth row 1195 of the two-dimensional grid 1183, a cell associated with the "Current State" trigger column includes the input value "any," a cell associated with the "Travel Related" trigger column includes the input value "any," and a cell associated with the "Classification" trigger column includes the input value "any." Given the values for the trigger columns 1188 in the sixth row 1195, any new purchase event for a customer that is received by the system satisfies the test defined by the sixth row 1195.

In the sixth row 1195 of the two-dimensional grid 1183, a cell associated with the "New State" output column includes the value "Current State" and a cell associated with the "Message" output column includes a null message 1199. Given the values for the output columns 1190 in the sixth row 1195, if the test defined by the sixth row 1195 is satisfied by the new purchase event for the customer, the customer's current state is maintained at its "Current State" and no notification message is sent to the customer.

When a new purchase event is received, the tests defined by the rows 1184 of the two-dimensional grid 1183 are applied in order to the new purchase event until a test is satisfied by the new purchase event. That is, the test defined by the first row 1185 is applied to the new purchase event first. If the test defined by the first row 1185 is not satisfied by the new purchase event, the test defined by the second row 1187 is applied to the new purchase event. If the test defined by the second row 1187 is not satisfied by the new purchase event, the test defined by the third row 1189 is applied to the new purchase event, and so on. Eventually, the default sixth (final) row 1195 is applied to and satisfied by the new purchase event if none of the tests defined by the other rows are satisfied by the new purchase event. By applying the tests defined by the rows 1184 of the two-dimensional grid 1183 in order, the functionality of the state diagram 1060 of FIG. 10 is achieved.

9 Alternatives

In some examples, performance of the user interface may be improved by opening read connections to the data sources for a given read operation and then caching the connections (e.g., saving a database handle and keeping the connection alive) for subsequent read operations. Doing so can reduce connection setup/takedown time as well as prevent exhaustion of a limit of number of connections to the data source within a given time period.

In some examples, records read from the data sources (or entire test data units) can be stored in a cache.

In some examples, when a value of a record (or a test data unit) is requested, the cache is first consulted. If the record (or test data unit) is not present in the cache, a cached connection is consulted to retrieve the requested record(s). If no connection is cached for retrieving the requested record (s), then a new connection is opened to retrieve the requested record(s).

In some examples, a determination of where to retrieve a record or a test data unit is based on a time since the record or test data unit was last retrieved. If it was recently retrieved, the cached value is determined to be valid and the cache is consulted. If a longer amount of time has passed since the record or test data unit was last retrieved, the cached value is deemed invalid and a cached connection is used. If an even longer amount of time has passed since the record or test data unit was last retrieved, a the cached value and the cached connection are deemed invalid and a new connection is opened to retrieve the record or test data unit.

While databases are one common type of data source that can benefit from the approaches described above, it is noted that many other types of data sources (e.g., archive files, secondary data sets, etc.) can benefit from the approaches as well.

In some examples, values of test data units, including accurate state information are cached for later use. In such cases, rather than having to apply the data processing rule to all test data units prior to a selected test data unit in single record test mode, only those records between the selected test data unit and the nearest prior cached test data unit need to have the data processing rule applied.

In some examples, the user interface allows a developer to specify when a database connection is cached.

In some examples, state variable values are only stored in the state variable memory for a predetermined amount of time before they are removed. In this way, the state variable essentially has a sliding window applied to it, allowing for operations such as windowed aggregation.

In some examples, when an input column requires parameter access, a value of the parameter can be cached. For example, in a production environment, a parameter may be read from a command-line input or a parameter set file and, if necessary be resolved in the context of an environment in which the rule-based application is launched (i.e., a production environment). For single unit testing mode (or batch testing mode), the value may optionally be selected (e.g., based on a user-settable parameter) as either the evaluated parameter using the current environment or an assumed test value instead, as an approximation of what the production environment would provide.

10 Implementations

The rule specification and application approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method that includes using at least one processor for:
   receiving an ordered set of data units, the ordered set of data units having a first subset of data units and a particular data unit, wherein each data unit of the first subset of data units is related to the particular data unit and precedes the particular data unit in the order of the ordered set of data units;
   receiving a rule for characterizing the ordered set of data units;
   determining a state characterizing the first subset of data units; and
   applying said rule including combining the state and the particular data unit.

2. The method of claim 1, further including updating the state based on applying said rule.

3. The method of claim 1, wherein each data unit of the ordered set of data units is formed from a primary data-source and from an auxiliary data-source.

4. The method of claim 1, wherein each data unit of the ordered set of data units includes a key obtained from a primary data-source and auxiliary data obtained from an auxiliary data source using said key.

5. The method of claim 1, wherein there exist inter-data unit dependencies between the ordered set of data units.

6. The method of claim 1, wherein the state depends at least in part on previous applications of the rule to data units of the first subset of data units.

7. The method of claim 6 wherein the previous applications of the rule to data units of the first subset of data units occurs according to the order of the ordered set of data units.

8. The method of claim 1, wherein an order of the ordered set of data units is defined by a sort order of a key that is present in each of said data units.

9. The method of claim 1, wherein, for each data unit of the ordered set of data units, a value that results from applying said rule to said data unit depends at least in part on already having applied said rule to at least one other data unit.

10. The method of claim 1 wherein a result of applying said rule to the particular data unit depends on the state.

* * * * *